Oct. 11, 1938.        C. D. STEWART        2,132,978
FLUID PRESSURE BRAKE
Filed Nov. 29, 1935
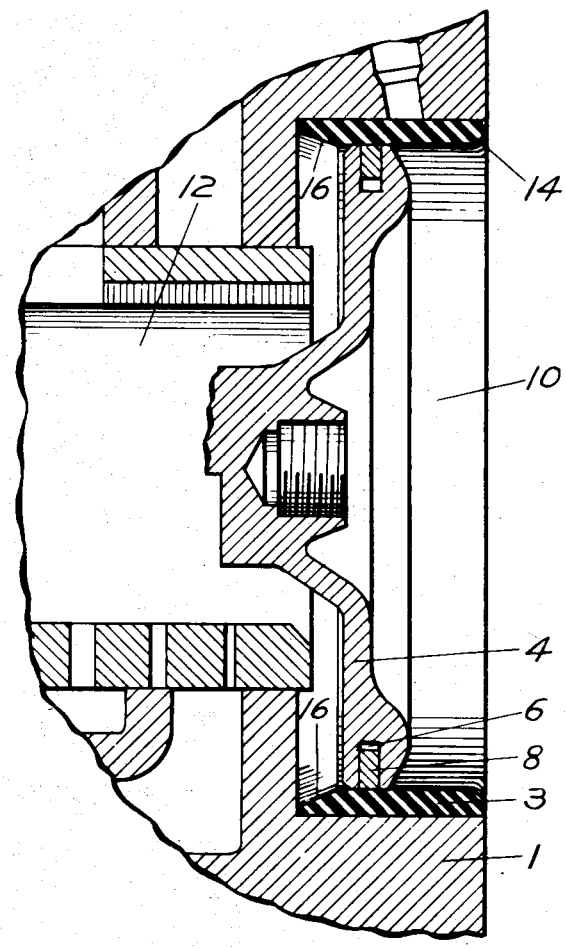
INVENTOR
CARLTON D. STEWART
BY
ATTORNEY Patented Oct. 11, 1938

2,132,978

UNITED STATES PATENT OFFICE 2,132,978

FLUID PRESSURE BRAKE

Carlton D. Stewart, Swissvale, Pa., assignor to The Westinghouse Air Brake Company, Wilmerding, Pa., a corporation of Pennsylvania Application November 29, 1935, Serial No. 52,149

13 Claims. (Cl. 309—1)

This invention relates to a brake controlling valve device adapted for use on railway cars.

These valve devices as heretofore constructed have had a body having a bore therein in which is mounted a piston, which has at one side thereof a chamber which communicates with the brake pipe, and has at the other side thereof a valve chamber containing a slide valve which is operated by the piston which is movable in response to differences in the pressures of the fluid in the chambers on opposite sides thereof.

The bodies of these valve devices are constructed of cast iron, and the bore in which the piston is mounted has been fitted with a brass bushing or liner, while the piston has been constructed of brass and has been equipped with a brass packing ring.

In the operation of a train of cars equipped with these brake controlling valve devices air is supplied to the brake pipe from a reservoir on the locomotive which is supplied with compressed air by a compressor which is mounted on the locomotive.

It has been found that the air which is supplied by the compressor to the reservoir, and from the reservoir to the brake pipe, contains a substantial quantity of moisture, and, in addition, may contain other impurities which cannot be removed by the air strainers incorporated in the brake equipment. Among these other impurities may be smoke, and as the coal from which the smoke was produced may have contained sulphur, the compounds of this element may be present in the air which is supplied to the brake pipe.

The sulphur compounds, as well as the other impurities present in the air, combine with the moisture present in the air and form active chemical compounds which attack the operating parts of the brake controlling valve devices.

It has been found that these compounds find their way between the bushings which line the chambers in which the pistons are mounted, and the piston packing rings, which because of the inherent resiliency of the material of which they are constructed are firmly pressed against the bushings. These compounds then react upon the bushings, and upon the piston packing rings, and by chemical or electrolytic action or both, cause material from the bushings to be deposited on the rings, or cause material from the rings to be deposited on the bushings. These deposits interfere with the movement of the pistons and increase their resistance to movement so that they will not move until the difference in the pressures in the chambers on the opposite sides thereof is substantially greater than that to which the pistons were intended to respond, with the result that the brake controlling valve devices will not function properly.

It has been found that the undesirable results produced by the active chemical compounds carried into the piston chamber of a valve device by the air from the brake pipe are reduced to such a degree as not to be objectionable if the bushing is constructed of a material which is inert chemically and is a non-conductor electrically.

It is an object of the present invention to provide a brake controlling valve device having a piston chamber fitted with a bushing which is impervious to the impurities carried by the air supplied to the brake controlling valve device, and which is a non-conductor of electricity.

A further object of the invention is to provide a brake controlling valve device having a piston chamber fitted with a bushing constructed of non-metallic material.

Another object of the invention is to provide a brake controlling valve device having a piston chamber fitted with a bushing constructed of molded plastic composition.

A further object of the invention is to provide an improved brake controlling valve device.

Other objects of the invention and features of novelty will be apparent from the following description taken in connection with the accompanying drawing, the single figure of which is a fragmentary sectional view of a brake controlling valve device embodying this invention.

Referring to the drawing the brake controlling valve device therein illustrated comprises a body 1 having a bore therein in which is fitted a bushing 3. A piston 4 is mounted in the bore in the bushing 3, and is provided with an annular ring groove 6 in which is fitted a piston packing ring 8, which is yieldingly forced into engagement with the inner face of the bushing 3 by the inherent resiliency of the material of which it is constructed. The piston 4 and the ring 8 may be constructed of any suitable material such as brass.

The piston 4 is subject on one side to the pressure of the fluid in a chamber 10, which communicates with the brake pipe, not shown, and is subject on the other side to the pressure of the fluid in a valve chamber 12, which contains a slide valve, not shown, which is operated by the piston.

The bushing 3, as shown, is a substantially annular ring having a bore therein of substantially the diameter of the piston 4, and being of such external diameter as to tightly fit the bore in the body 1. The bushing 3 has an axial width somewhat greater than the range of movement permitted the piston 4, and the margin of the bushing adjacent the face of the body 1 is chamfered or rounded, as indicated at 14, to facilitate the insertion of the piston in the bore in the bushing, while the other end of the bore is tapered, as indicated at 16.

According to my invention the bushing 3 is constructed of a material which is inert chemically and which is a non-conductor of electricity. I have found that molded plastic composition is adapted for this purpose, and I prefer to construct the bushing of this material.

In the preferred embodiment of the invention a composition is employed which will absorb only a minimum of moisture, so that the bushing will not swell and reduce the diameter of the bore therein when exposed to the moisture in the air supplied to the brake controlling valve device and thereby cause the piston to bind. This composition should also retain its size and not shrink with age so that the bushing will become loose in the bore in the body of the valve device, and the composition should have a relatively low coefficient of friction so as to offer a minimum of resistance to movement of the piston and the piston packing ring thereon. In addition the composition should be strong enough that it may be pressed into position in the bore in the body and be handled without breaking or cracking, and should withstand wear as a result of the movement of the piston and packing ring thereon.

I have found that a material suitable for this purpose may be formed by impregnating a plurality of layers of reinforcing material, such as sheets of cotton fabric, with a thermoplastic resin, and then placing the material in a mold and subjecting the product to high pressure and suitable temperature, which because of the characteristics of the resin, causes the reinforcing material to be thoroughly saturated with the resin so as to become practically impervious to moisture, while the body becomes a solid possessing the desired physical, chemical and electrical properties. By this process material in sheet form may be formed which is of a thickness somewhat greater than the axial length of a bushing, and bushing may be formed from this sheet by suitable machining processes.

I have found that a suitable material may also be formed by impregnating a quantity of small pieces of similar cotton fabric with this resin and placing the material in a mold and subjecting it to heat and pressure. This material may be readily molded to a shape substantially the size and form of the finished bushing so that a minimum of machining is required to complete the bushing.

It has been found that brake controlling valve devices constructed in accordance with this invention and having the piston bushings thereof formed of a material which is inert chemically and a non-conductor electrically, such as molded plastic composition, are not affected by the impurities carried by the air supplied to the brake system to the same extent as brake controlling valve devices employing metallic piston bushings.

It has been found also that where the piston bushings are constructed of molded plastic composition the action of the impurities carried by the air supplied to the piston chambers of the valve devices on the piston rings and the piston bushings is reduced to such an extent as not to interfere with the movement of the pistons to an objectionable degree.

While one embodiment of the improved brake controlling valve device provided by my invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake equipment, a brake controlling valve device comprising, in combination, a body having a bore therein, a bushing secured in said bore, and a piston reciprocable in the said bushing, said piston carrying a metallic packing ring, said bushing being constructed of molded plastic composition.

2. In a fluid pressure brake equipment, a brake controlling valve device comprising, in combination, a body having a bore therein, a bushing secured in said bore, and a piston having a metallic packing ring reciprocable in the said bushing, said bushing being constructed of non-metallic material.

3. In a fluid pressure brake equipment, a brake controlling valve device comprising, in combination, a body having a bore therein, a bushing secured in said bore, and a piston reciprocable in the said bushing and being provided with a metallic packing ring, said bushing being constructed of a non-metallic material which is inert chemically and a non-conductor electrically.

4. In a fluid pressure brake equipment, a brake controlling valve device comprising, in combination, a body having a bore therein, a bushing secured in said bore, and a piston reciprocable in the said bushing and carrying a metallic packing ring, said bushing being constructed of a non-metallic material which is impervious to the action of the impurities carried by the air supplied to the said brake equipment.

5. In a fluid pressure brake equipment, a brake controlling valve device comprising, in combination, a body having a bore therein, a bushing secured in said bore, and a piston reciprocable in said bushing, the piston being equipped with a packing ring, the piston and packing ring being constructed of metal, the bushing being constructed of a non-metallic material.

6. In a fluid pressure brake equipment, a brake controlling valve device comprising in combination, a body having a bore therein, a bushing secured in said bore, and a piston reciprocable in said bushing, the piston being equipped with a packing ring, the piston and packing ring being constructed of metal, the bushing being constructed of molded plastic composition which is a non-conductor electrically.

7. In a fluid pressure brake equipment, a brake controlling valve device comprising, in combination, a body having a bore therein, a bushing secured in said bore, and a piston reciprocable in said bushing, the piston being equipped with a packing ring, the piston and packing ring being constructed of metal, the bushing being constructed of a non-metallic material which is inert chemically and a non-conductor electrically.

8. In a fluid pressure brake equipment operated by fluid from the atmosphere which may contain impurities which have a corrosive action on portions of the brake equipment, a brake controlling valve device comprising, in combination, a body having a bore therein, a bushing secured in said bore, and a piston reciprocable in said bushing, the piston being equipped with a packing ring, the piston and packing ring being constructed of metal, the bushing being constructed of non-metallic material which is substantially impervious to the action of the impurities carried by the fluid supplied to the brake equipment, whereby changes in the resistance to movement of the piston while in service are minimized.

9. In a fluid pressure brake equipment, a brake controlling valve device comprising a casing having a bore therein, a bushing constructed of non-metallic material mounted in said bore, and a metallic piston provided with a metallic packing ring, the piston being reciprocable in said bushing and normally subject on opposite sides to fluid under pressure and operable upon a reduction in fluid pressure on one side thereof.

10. In combination, a casing provided with a chamber, a non-metallic bushing of resinous material disposed in said chamber, a piston reciprocable in said bushing, and a metallic ring carried by said piston and providing a seal between said piston and said bushing.

11. In combination, a metallic casing having a bore therein, a bushing of molded resinous composition disposed in said bore, a piston movable back and forth in said bushing by differential fluid pressures of the order of one pound or less, and a metallic packing ring disposed on the periphery of said piston and providing a seal between said piston and said bushing.

12. In a fluid pressure brake equipment operated by fluid from the atmosphere which may contain impurities which have a corrosive action on portions of the brake equipment, a brake controlling valve device comprising, in combination, a body having a bore therein, a bushing secured in said bore, and a piston reciprocable in said bushing, the piston being equipped with a packing ring, the piston and packing ring being constructed of metal, the bushing being constructed of reenforced thermoplastic resin material which is substantially impervious to the action of the impurities carried by the fluid supplied to the brake equipment, whereby changes in the resistance to movement of the piston while in service are minimized.

13. In a fluid pressure brake equipment, a brake controlling valve device comprising a casing having a bore therein, a bushing constructed of reenforced thermoplastic resin material mounted in said bore, and a metallic piston provided with a metallic packing ring, the piston being reciprocable in said bushing and normally subject on opposite sides to fluid under pressure and operable upon a reduction in fluid pressure on one side thereof.

CARLTON D. STEWART.